United States Patent
Pan et al.

(10) Patent No.: US 7,715,305 B2
(45) Date of Patent: *May 11, 2010

(54) DATA DETECTION METHOD AND RECEIVER

(75) Inventors: Jung-Lin Pan, Selden, NY (US); Ariela Zeira, Huntington, NY (US); Parthapratim De, Camp Bell, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/370,113

(22) Filed: Mar. 7, 2006

(65) Prior Publication Data

US 2006/0182070 A1 Aug. 17, 2006

Related U.S. Application Data

(63) Continuation of application No. 11/100,901, filed on Apr. 7, 2005, now Pat. No. 7,054,300, which is a continuation of application No. 10/077,527, filed on Feb. 15, 2002, now Pat. No. 6,904,036, which is a continuation of application No. 09/814,346, filed on Mar. 22, 2001, now Pat. No. 6,885,654.

(60) Provisional application No. 60/266,932, filed on Feb. 6, 2001, provisional application No. 60/268,587, filed on Feb. 15, 2001.

(51) Int. Cl.
*H04J 11/00* (2006.01)
*H04B 7/216* (2006.01)
*H04B 1/00* (2006.01)

(52) U.S. Cl. .................... 370/210; 370/335; 370/342; 370/441; 375/142; 375/150

(58) Field of Classification Search ................ 370/342, 370/210, 335, 441; 375/150, 142
See application file for complete search history.

(56) References Cited

U.S. PATENT DOCUMENTS 5,719,899 A 2/1998 Thielecke et al.
5,790,537 A 8/1998 Yoon et al.

(Continued)

FOREIGN PATENT DOCUMENTS

WO 99/40698 11/1998
WO WO 99/40698 11/1998

OTHER PUBLICATIONS

Equalizers for multi-user detection in code division multiple access mobile radio systems. Anja Klein, Ghassan Kawas Kaleh and Paul Walter Baier. IEEE 44th Vehicular Technology Conference, 1994.*

(Continued)

*Primary Examiner*—Daniel J Ryman
*Assistant Examiner*—Cassandra Decker
(74) *Attorney, Agent, or Firm*—Volpe and Koenig, P.C.

(57) ABSTRACT

A method of recovering data for use in a receiver that simultaneously receives a plurality of code division multiple access data signals, each data signal experiencing a similar channel response. A combined signal over the shared spectrum in a time slot is received and sampled. The combined signal comprises the plurality of data signals. The sampled signal is used to estimate the similar channel response, and a channel response matrix is constructed. A channel correlation matrix is constructed based in part on the estimated channel response matrix. A fast Fourier transform (FFT) decomposition of a circulant matrix approximation of the channel correlation matrix, and the sampled data signals, are used to determine a spread data vector. The spread data vector is despread to recover data from the matrix.

16 Claims, 9 Drawing Sheets

U.S. PATENT DOCUMENTS

| | | | |
|---|---|---|---|
| 6,590,889 | B1 | 7/2003 | Preuss et al. |
| 6,608,859 | B2 | 8/2003 | De et al. |
| 6,625,203 | B2 | 9/2003 | De et al. |
| 6,798,850 | B1 | 9/2004 | Wedin et al. |
| 6,873,596 | B2 | 3/2005 | Zhang et al. |
| 6,879,578 | B2 * | 4/2005 | Pan et al. ............ 370/342 |
| 6,885,654 | B2 * | 4/2005 | Pan et al. ............ 370/342 |
| 6,904,036 | B2 * | 6/2005 | Pan et al. ............ 370/342 |
| 7,054,300 | B2 * | 5/2006 | Pan et al. ............ 370/342 |

OTHER PUBLICATIONS

Bini, Dario, "Toeplitz Matrices, Algorithms and Applications", ERICIM News, Jul. 1995.

Circulant Matrices, http://www.mai.liu.se/~evlun/pub/lic/mode9.html.

Fast Matrix-Vector Multiplication for Structured Matrices, www.cs.utk.edu/~dongarra/etemplates/node384.html.

Toeplitz Matrix, http://planetmath.org/encyclopedia/ToeplitzMatrix.html.

Benvenuto, N. et al., entitled: "Joint Detection with Low Computational Complexity for Hybrid TD-CDMA Systems,"VTC, Fall 1999. IEEE VTS 50th, Vehicular Technology Conference, Amsterdam, Sep. 19, 1999, IEEE Vehicular Technology Conference, NY, NY IEEE US, vol. 1 Conf. 50, pp. 618-622.

Bini, Dario, "Toeplitz Matrices, Algorithms and Applications", ERICIM News No. 22, Jul. 1995.

Fast Matrix-Vector Multiplication for Structured Matrices, www.cs.utk.edu/~dongarra/etemplates/node384.html.

Siemens, "Reference Measurement Channels for TDD-mode-Revised", TSGW4#7(99)554, TSG-RAN Working Group 4 Meeting #7, Makuhari, Japan, Sep. 7-10, 1999.

"Guidelines for Evaluation of Radio Transmission Technologies for IMT-2000," Recommendation ITU-R M. 1225, 1997, pp. 1-60.

Benvenuto, N. et al., entitled: "Joint Detection with Low Computational Complexity for Hybrid TD-CDMA Systems," VTC, Fall 1999. IEEE VTS 50th, Vehicular Technology Conference, Amsterdam, Sep. 19, 1999, IEEE Vehicular Technology Conference, NY, NY IEEE US, vol. 1 Conf. 50, pp. 618-622.

Bini, Dario, "Toeplitz Matrices, Algorithms and Applications", ERICIM News No. 22, Jul. 1995.

Fast Matrix-Vector Multiplication for Structured Matrices, www.cs.utk.edu/~dongarra/etemplates/node384.html.

Karimi, H.R. and Anderson, N. W., "A Novel and Efficient Solution to Block-Based Joint-Detection Using Approximate Cholesky Factorization," Motorola GSM Products Division, Swindon, UK, 1998.

Klein et al., "Equalizers for multi-user detection in code division multiple access mobile radio systems," IEEE 44th Vehicular Technology Conference, 99. 762-766 (Jun. 1994).

Klein, Anja and Baier, Paul W., "Linear Unbiased Data Estimation in Mobile Radio Systems Applying CDMA," IEEE Journal on Selected Areas in Communications, vol. 11, No. 7, Sep. 1993.

Klein, Anja, "Data Detection Algorithms Specially Designed for the Downlink of CDMA Mobile Radio Systems," IEEE 47th Vehicular Technology Conference, Phoenix, Arizona, USA, May 4-7, 1997.

Klein, Anja; Kaleh, Ghassan K. and Baier, Paul W., "Zero Forcing and Minimum Mean-Square-Error Equalization for Multiuser Detection in Code-Division Multiple-Access Channels," IEEE Transactions on Vehicular Technology, vol. 45, No. 2, May 1996.

Moulines et al., "Subspace Methods for the Blind Identification of Multichannel Fir Filters," IEEE, 1994, pp. IV-573-IV-576.

PA Consulting Group/Racal Instruments Ltd., "Low Cost MMSE-BLE-SD Algorithm for UTRA TDD Mode Downlink," ETSI STC SMG2 Layer 1 Expert Group, Helsinki, Finland Sep. 8-11, 1998.

Pan et al., "Low Complexity Data Detection Using Fast Fourier Transform Deocomposition of Channel Correlation Matrix," IEEE, 2001, pp. 1322-1326.

Prasad et al., "Third Generation Mobile Communication Systems," Universal Personal Communications, Artech House Publishers, 2000, pp. 91-131.

Siemens, "Reference Measurement Channels for TDD-mode-Revised", TSGW4#7(99)554, TSG-RAN Working Group 4 Meeting #7, Makuhari, Japan, Sep. 7-10, 1999.

Third Generation Partnership Project, 3GPP TS 25.102 v3.4.0 (Oct. 2000), Technical Specification Group Radio Access Networks; UTRA (UE) TDD; Radio Transmission and Reception (Release 1999).

Van Der Veen et al., "Blind Estimation of Multiple Digital Signals Transmitted over FIR Channels," IEEE Signal Processing Letters, vol. 2, No. 5, May 1995, pp. 99-102.

* cited by examiner

FIG. 5 tddWg4Case1, commonCh, EqualAvgPwr, 12 codes with txGrpSize of 1
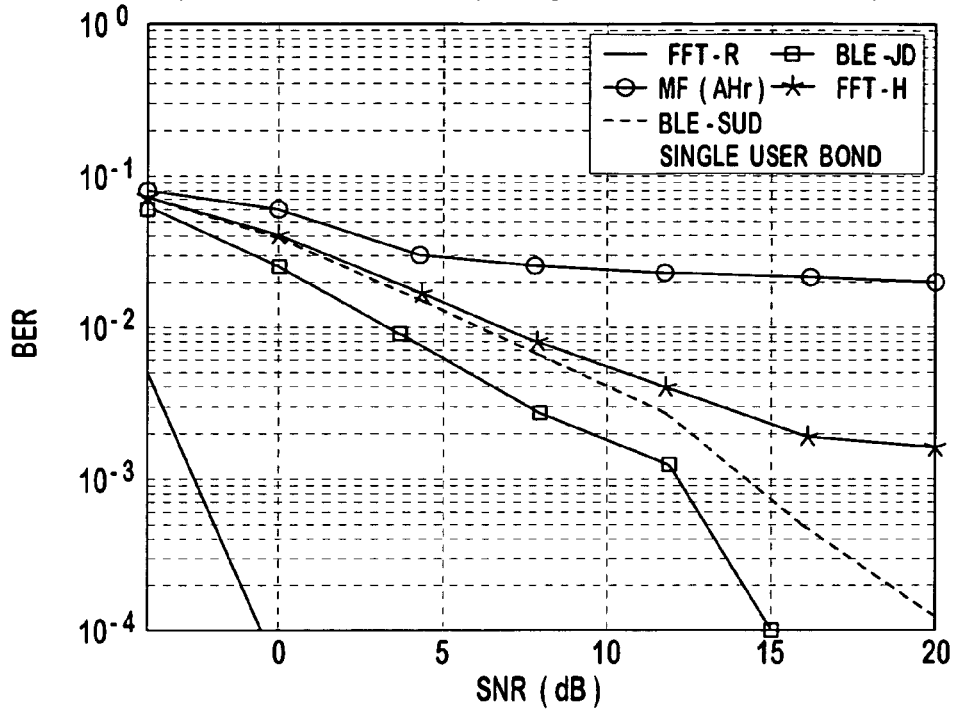
FIG. 6 tddWg4Case2, commonCh, EqualAvgPwr, 12 codes with txGrpSize of 1
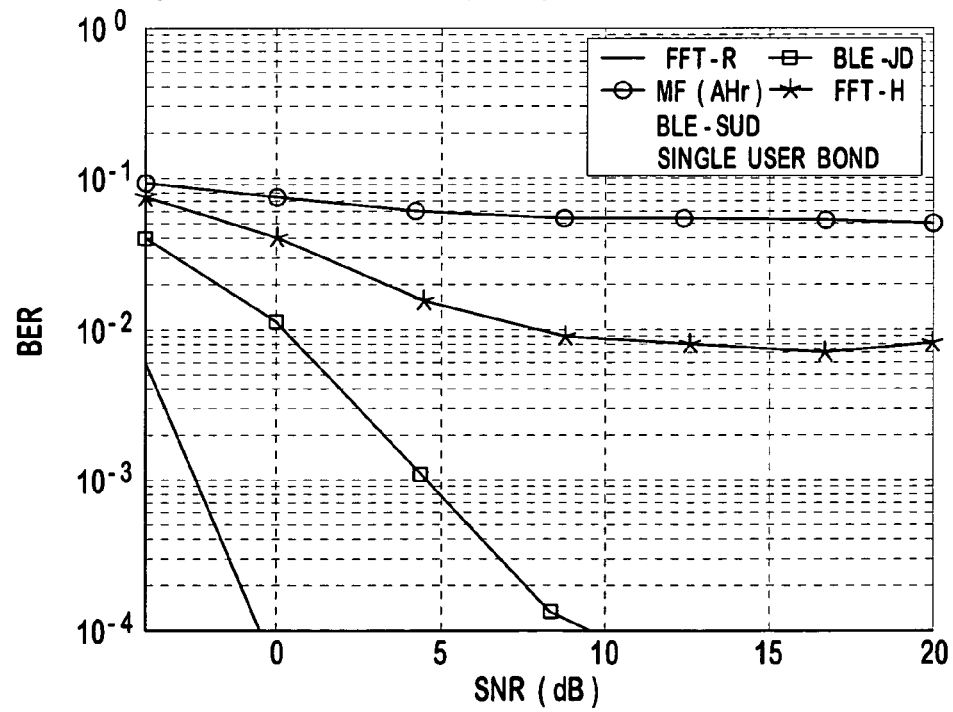

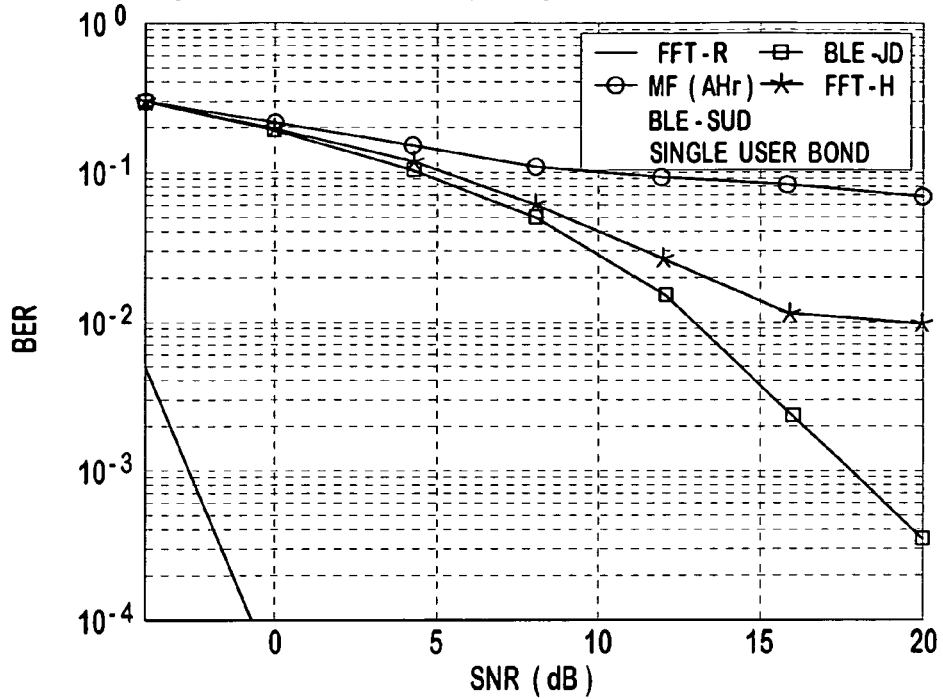
FIG. 9 tddWg4Case2, commonCh, EqualAvgPwr, 1 codes with txGrpSize of 1
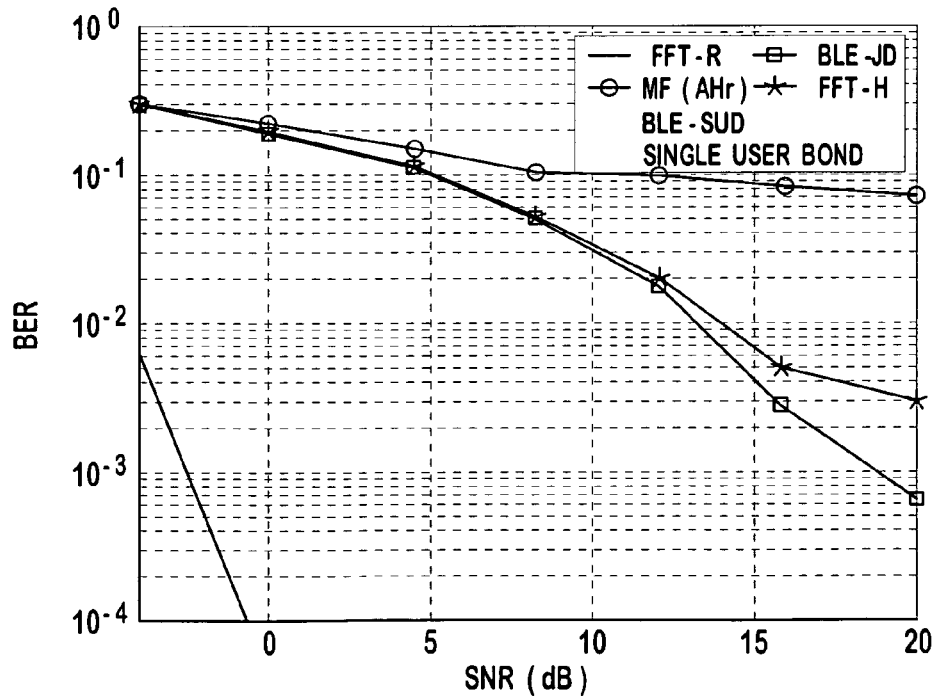
FIG. 10 tddWg4Case3, commonCh, EqualAvgPwr, 1 codes with txGrpSize of 1

DATA DETECTION METHOD AND RECEIVER

CROSS REFERENCE TO RELATED APPLICATIONS

This application is a continuation of U.S. patent application Ser. No. 11/100,901, filed Apr. 7, 2005, which is a continuation of U.S. patent application Ser. No. 10/077,527, filed Feb. 15, 2002, which is a continuation of U.S. patent application Ser. No. 09/814,346, filed Mar. 22, 2001, now U.S. Pat. No. 6,885,654, which claims priority from U.S. Provisional Patent Application No. 60/266,932, filed Feb. 6, 2001 and U.S. Provisional Patent Application No. 60/268,587, filed Feb. 15, 2001, incorporated by reference as if set forth.

FIELD OF INVENTION

The invention generally relates to wireless communication systems. In particular, the invention relates to data detection in a wireless communication system.

BACKGROUND

FIG. 1 is an illustration of a wireless communication system 10. The communication system 10 has base stations $12_1$ to $12_5$ which communicate with user equipments (UEs) $14_1$ to $14_3$. Each base station $12_1$ has an associated operational area, where it communicates with UEs $14_1$ to $14_3$ in its operational area.

In some communication systems, such as code division multiple access (CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into time slots for communication. A communication sent in such a system will have one or multiple associated codes and time slots assigned to it. The use of one code in one time slot is referred to as a resource unit.

Since multiple communications may be sent in the same frequency spectrum and at the same time, a receiver in such a system must distinguish between the multiple communications. One approach to detecting such signals is multiuser detection. In multiuser detection, signals associated with all the UEs $14_1$ to $14_3$, users, are detected simultaneously. Approaches for implementing multiuser detection include block linear equalization based joint detection (BLE-JD) using a Cholesky or an approximate Cholesky decomposition.

Another approach is single user detection. In single user detection, data is only recovered for a single user (one UE $14_1$). Based on the application, the single user detected data may have been sent using one or multiple codes. Approaches for implementing single user detection include block linear equalization using a Cholesky or an approximate Cholesky decomposition. These approaches have a high complexity. The high complexity leads to increased power consumption, which at the UE $14_1$ results in reduced battery life. Accordingly, it is desirable to have alternate approaches to detecting received data.

SUMMARY

A method of recovering data for use in a receiver that simultaneously receives a plurality of code division multiple access data signals, each data signal experiencing a similar channel response. A combined signal over the shared spectrum in a time slot is received and sampled. The combined signal comprises the plurality of data signals. The sampled signal is used to estimate the similar channel response, and a channel response matrix is constructed. A channel correlation matrix is constructed based in part on the estimated channel response matrix. A fast Fourier transform (FFT) decomposition of a circulant matrix approximation of the channel correlation matrix, and the sampled data signals, are used to determine a spread data vector. The spread data vector is despread to recover data from the matrix.

BRIEF DESCRIPTION OF THE DRAWINGS

FIGS. 5-15 are graphs of the performance of low complexity data detection.

DETAILED DESCRIPTION OF THE PREFERRED EMBODIMENTS

Figure 2:
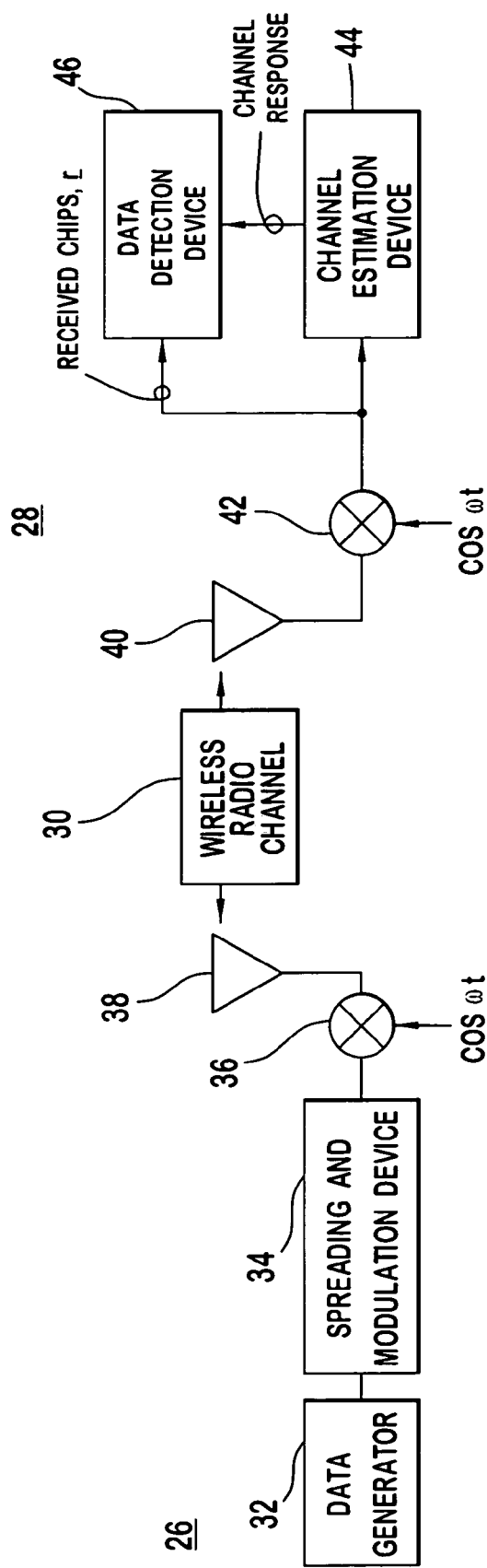
FIG. 2 is a simplified transmitter and a single user detection receiver.

FIG. 2 illustrates a simplified transmitter 26 and receiver 28 using low complexity data detection in a TDD/CDMA communication system. In a typical system, a transmitter 26 is in each UE $14_1$ to $14_3$ and multiple transmitting circuits 26 sending multiple communications are in each base station $12_1$ to $12_5$. The low complexity data detector receiver 28 may be at a base station $12_1$, UEs $14_1$ to $14_3$ or both. The receiver 28 can be used at a UE $14_1$ for either multiuser or single user detection of a medium to high data rate service, such as a 2 megabits per second (Mbs). The receiver 28 can also be used at a base station $12_1$, when only a single UE $14_1$ transmits in a time slot.

The transmitter 26 sends data over a wireless radio channel 30. A data generator 32 in the transmitter 26 generates data to be communicated to the receiver 28. A modulation/spreading sequence insertion device 34 spreads the data and makes the spread reference data time-multiplexed with a midamble training sequence in the appropriate assigned time slot and codes for spreading the data, producing a communication burst or bursts.

Figure 1:
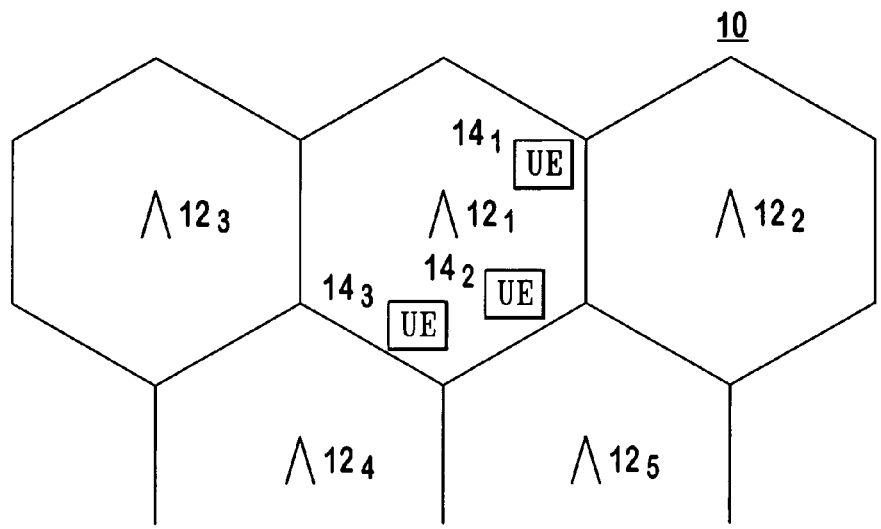
FIG. 1 is a wireless communication system.
Figure 3:
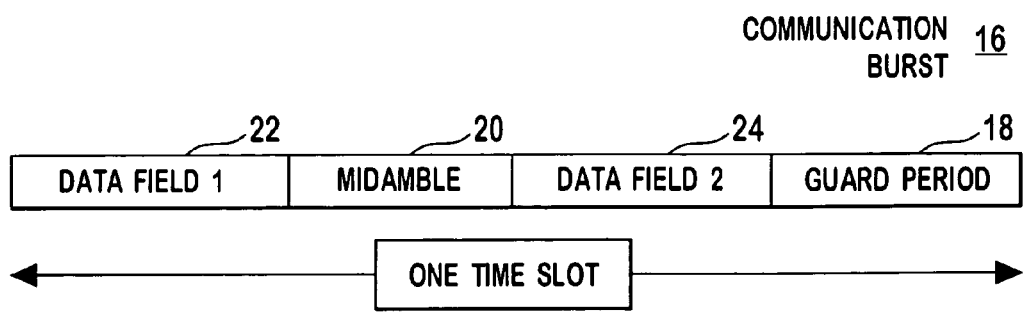
FIG. 3 is an illustration of a communication burst.

A typical communication burst 16 has a midamble 20, a guard period 18 and two data bursts 22, 24, as shown in FIG. 3. The midamble 20 separates the two data bursts 22, 24 and the guard period 18 separates the communication bursts to allow for the difference in arrival times of bursts transmitted from different transmitters 26. The two data bursts 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or an N-ary quadrature amplitude modulation (QAM).

The antenna 40 of the receiver 28 receives various radio frequency signals. The received signals are demodulated by a demodulator 42 to produce a baseband signal. The baseband signal is processed, such as by a channel estimation device 44 and a low complexity data detection device 46, in the time slot and with the appropriate codes assigned to the received bursts. The channel estimation device 44 uses the midamble training sequence component in the baseband signal to provide channel information, such as channel impulse responses. The channel information is used by the data detection device 46 to estimate the transmitted data of the received communication bursts as hard symbols.

Figure 4:
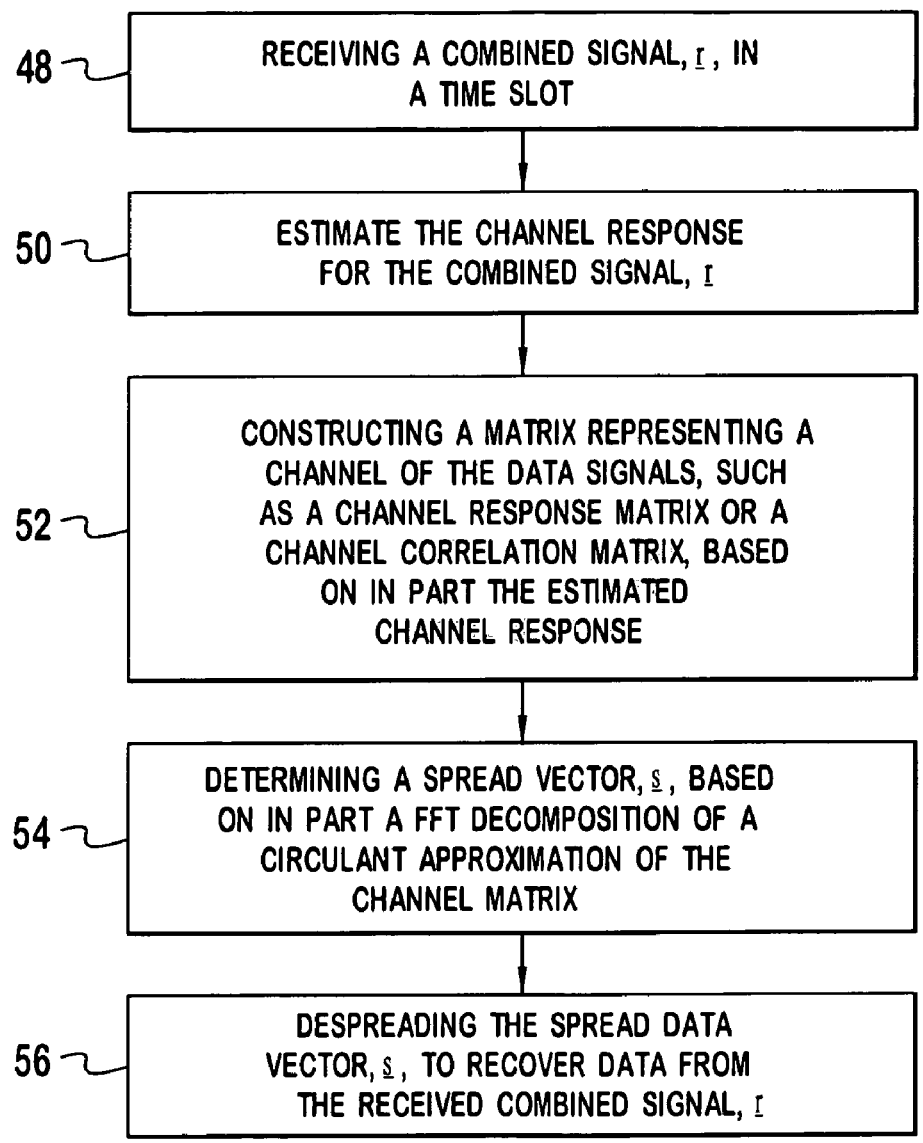
FIG. 4 is a flowchart of low complexity data detection.
Figure 7:
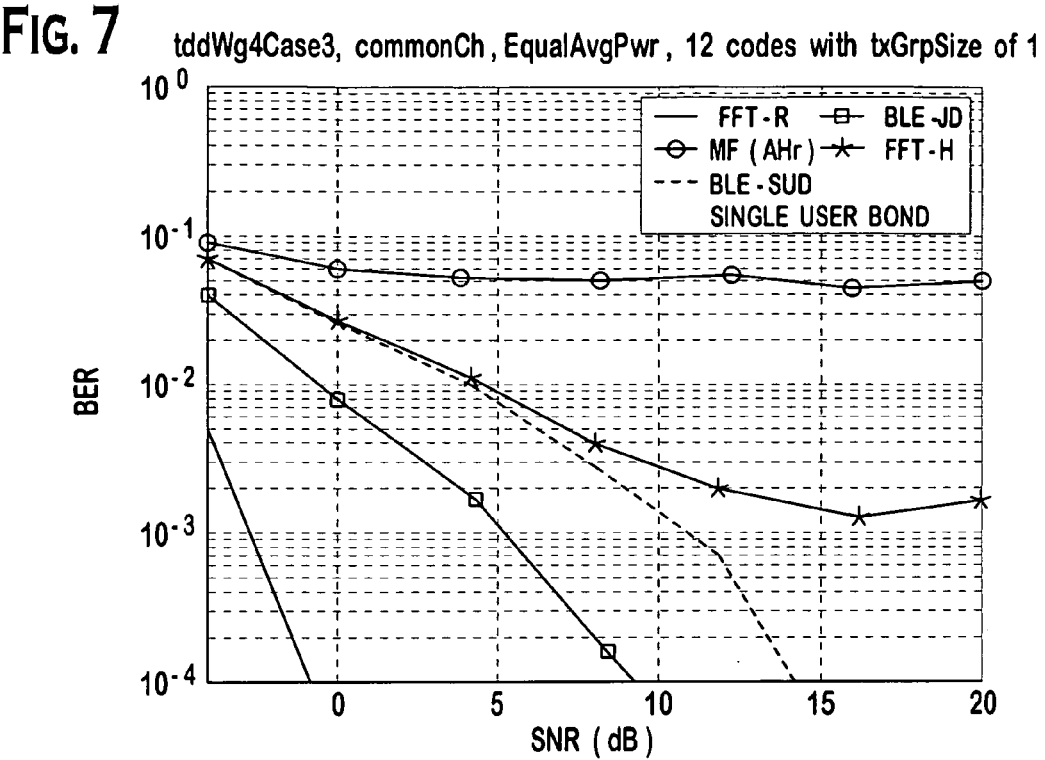
Figure 8:
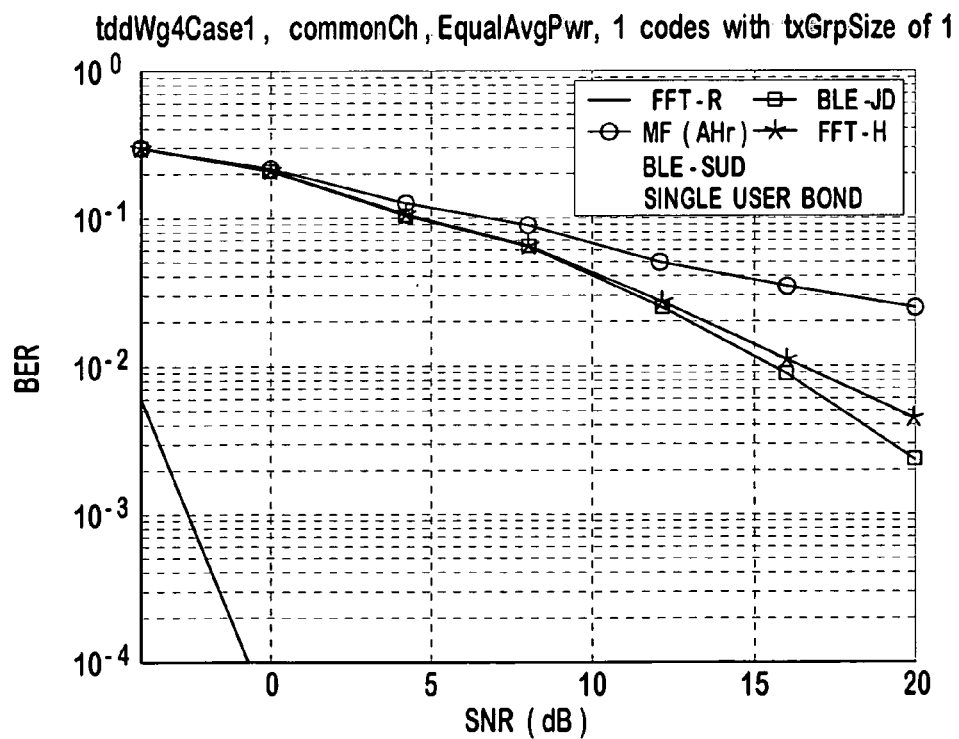
Figure 11:
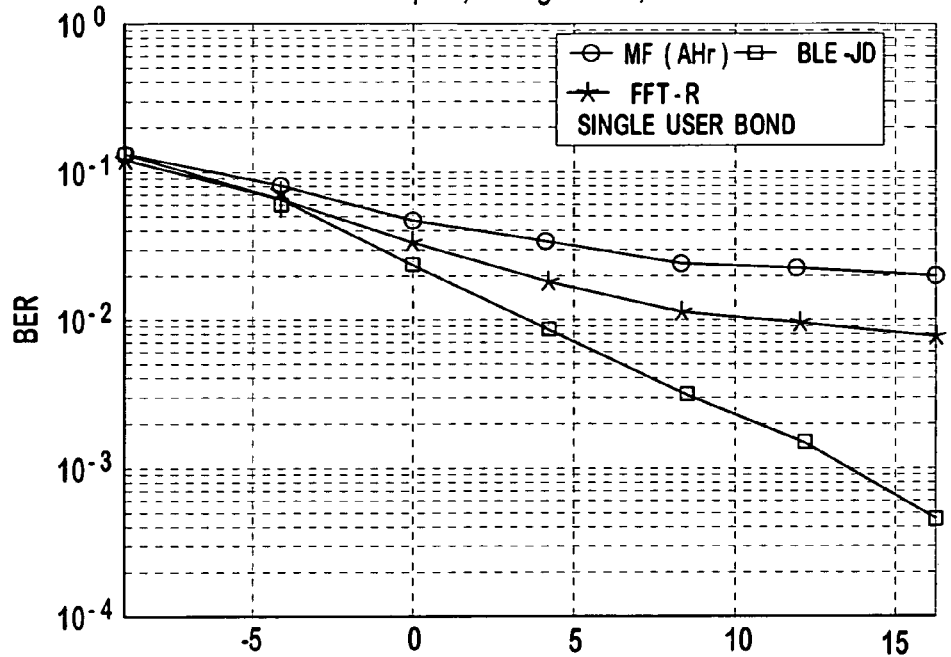
Figure 12:
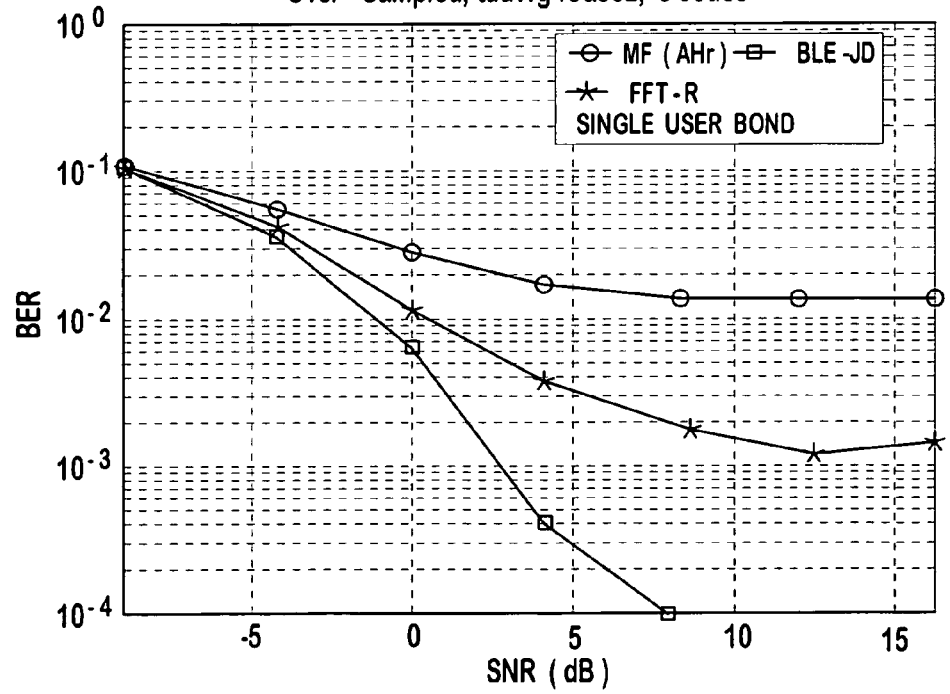
Figure 13:
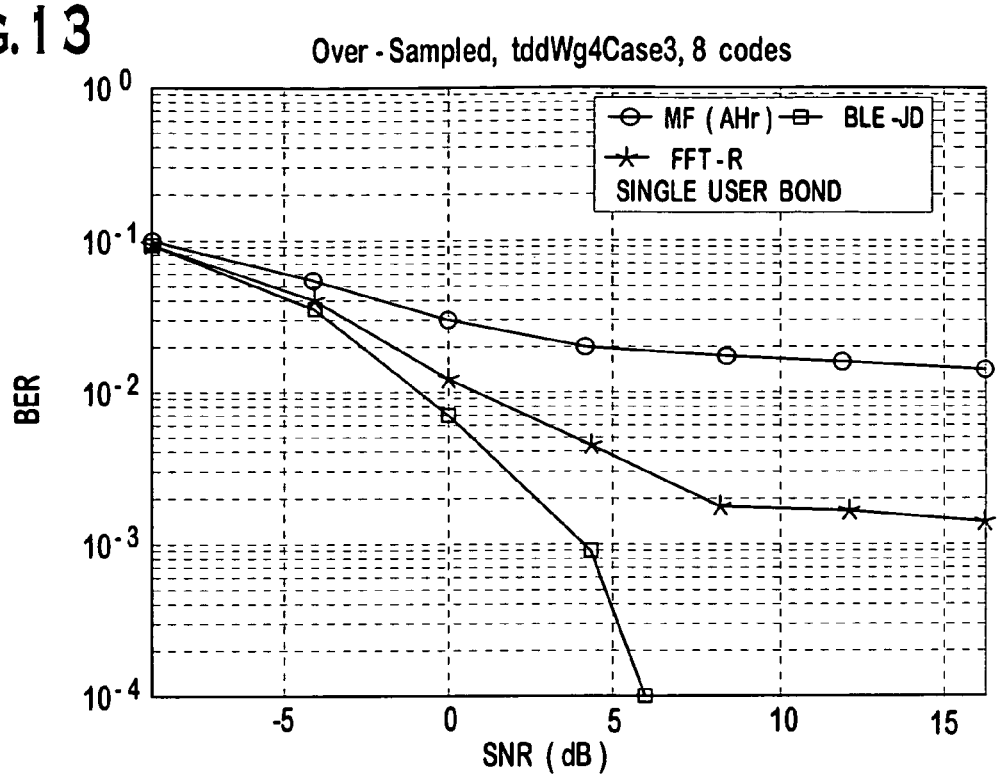
Figure 14:
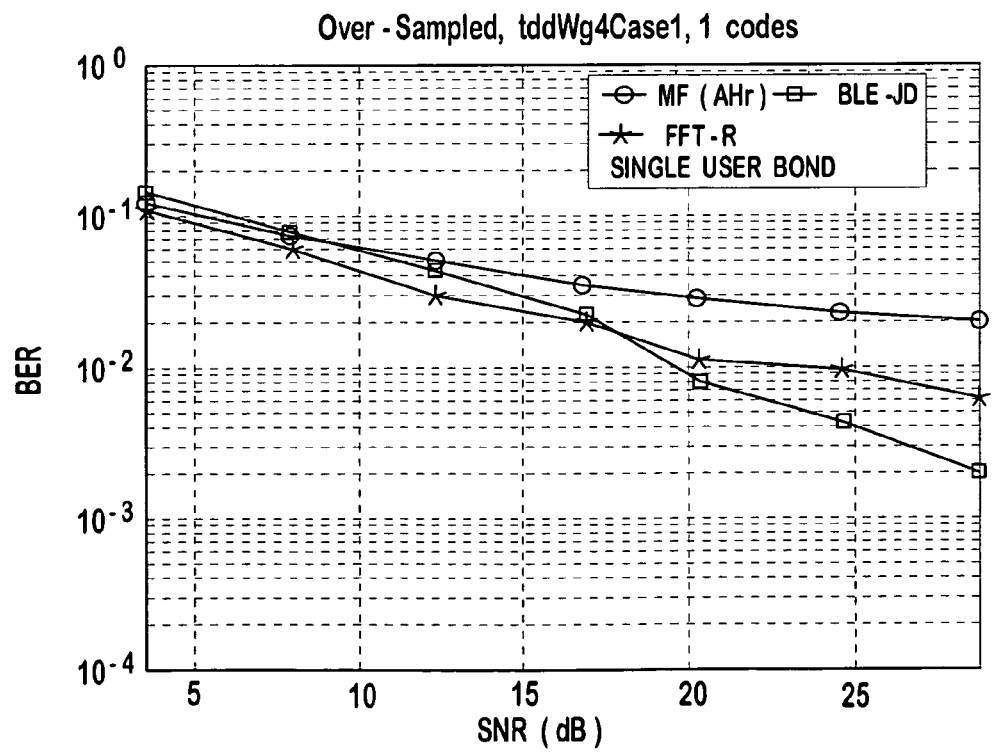
Figure 15:
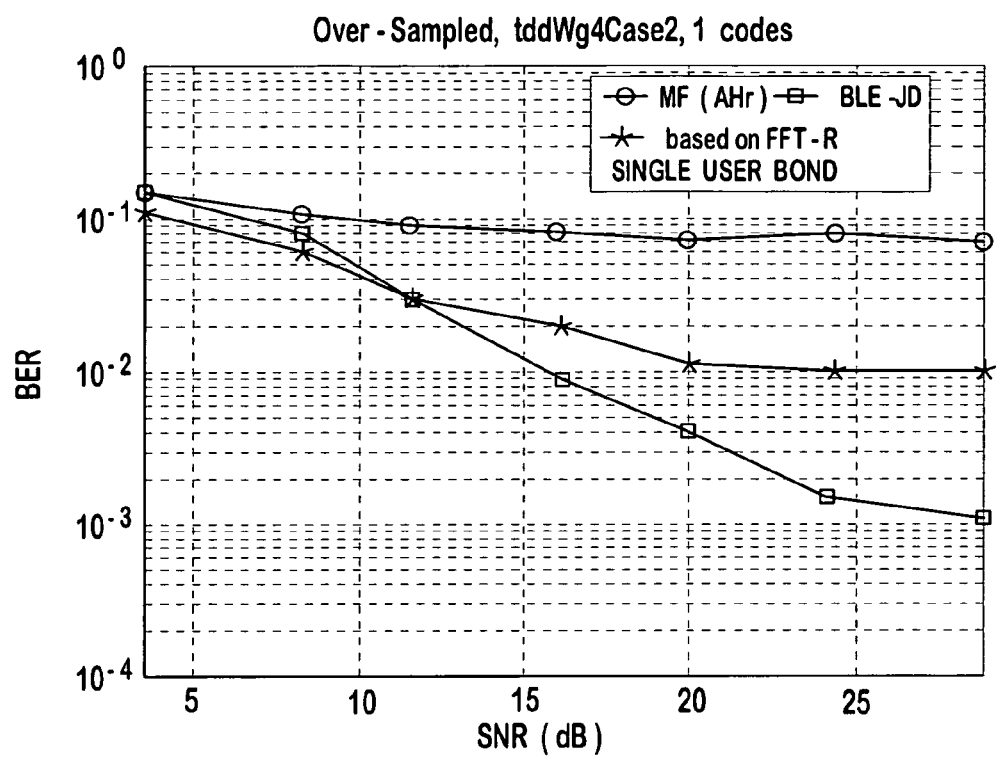

The data detection device 46 uses the channel information provided by the channel estimation device 44 and the known spreading codes used by the transmitter 26 to estimate the data of the desired received communication burst(s). Low complexity data detection is explained in conjunction with the flowchart of FIG. 4. Although low complexity data detection is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive time slots.

The receiver 28 receives using its antenna 40 a total of K bursts that arrive simultaneously, 48. The K bursts are superimposed on top of each other in one observation interval. Some or all of the K bursts may arise from or go to the same users for higher data rate services. For the 3GPP UTRA TDD system, each data field of a time slot corresponds to one observation interval.

A $k^{th}$ burst of the K bursts uses a code of $C^{(k)}$ of length Q chips to spread each of its $N_s$ symbols to yield a sequence of length $Q \cdot N_s$ chips. The $k^{th}$ burst passes through a channel with a known or estimated channel response, $h^{(k)}$, of length W chips to form a chip sequence of length, $N_c = (SF \cdot N_s + W - 1)$. SF is the spreading factor. Since uplink signals may originate from multiple UEs $14_1$ to $14_3$, each $h^{(k)}$ in the uplink may be distinct. For the downlink in the absence of transmit diversity, all bursts pass through the same channel and have the same $h^{(k)}$. At the receiver 28, the bursts from all users arrive superimposed as a single received vector, r. Some or all of the K bursts may be part of a multi-code transmission. The multi-codes have the same $h^{(k)}$, because they originate from the same transmitter 26.

The multi-user signal model consists of $N_c$ known received chips and $K \cdot N_s$ unknown information bearing symbols. The symbol response, $s^{(k)}$, of the $k^{th}$ burst is the convolution of $C^{(k)}$ with $h^{(k)}$. Accordingly, $s^{(k)}$ is of length (SF+W−1) chips. W is the impulse response, which represents the trail of chips left by a unity symbol. The $N_s$ unknown symbols of the $k^{th}$ burst form a column vector $d^{(k)}$. $r^{(k)}$ is the contribution of the $k^{th}$ burst to the overall received chip vector, $r \cdot d^{(k)}$ is the data vector for the $k^{th}$ burst. $d^{(k)}$ and $r^{(k)}$ are related by Equation 1.

$$r^{(k)} = A^{(k)} d^{(k)}, \text{ where } k=1 \ldots K \qquad \text{Equation 1}$$

$A^{(k)}$ is the channel response matrix for the $k^{th}$ burst, which is an $N_c \times N_s$ matrix whose $j^{th}$ column is the symbol-response of the element of $d^{(k)}$. Assuming a time-invariant symbol-response, each column of $A^{(k)}$ has the same support, $s^{(k)}$, and successive columns are zero-padded and shifted versions of the first column. The overall, chip-rate, received vector is per Equation 2.

$$r = \sum_{i=1}^{K} r^{(k)} + n \qquad \text{Equation 2}$$

n is a zero-mean noise vector with independent identical distribution (i.i.d.) components of the variance, $\sigma^2$. Equation 2 becomes Equation 3, when written as a single matrix equation.

$$r = Ad + n \qquad \text{Equation 3}$$

A is the overall channel response matrix, which is a matrix of size $N_c \times K \cdot N_s$. d is the data vector, which is a column vector of length $K \cdot N_s$. Equation 2 and Equation 3 model the inter-symbol interference (ISI) and multiple-access interference (MAI) in the received vector, r.

The signal models of Equations 1, 2 and 3 are formulated for chip rate sampling, such as 3.84 Mega chips per second (Mcps) in 3GPP UTRA system. For increased statistical accuracy, a receiver 28 may use over-sampling, such as a multiple chip rate sampling. A typical multiple chip rate sampling is twice the chip rate, although other multiples may be used. When using multiple chip rate sampling, the received signal burst will be over-sampled generating multiple sampled sequences. Each sequence is sampled at the chip rate with different time offsets with respect to one another. The $k^{th}$ burst passes through a channel with a known or estimated channel response, $h_m^{(k)}$, for the $m^{th}$ sampled sequence. $r_m^{(k)}$ is the contribution of the $k^{th}$ burst to the $m^{th}$ overall sampled chip vector, $r_m$. The data symbol vectors $d^{(k)}$ and the $m^{th}$ sampled chip vector $r_m^{(k)}$ are related by Equation 4.

$$r_m^{(k)} = A_m^{(k)} d^{(k)}, k=1 \ldots K, m=1 \ldots M \qquad \text{Equation 4}$$

$A_m^{(k)}$ is the symbol response matrix for the $m^{th}$ sequence. It is a matrix of size $N_c \times N_s$, whose $j^{th}$ column is the $m^{th}$ sampled symbol-response of the $j^{th}$ element of $d^{(k)}$.

Equation 5 is the overall, chip-rate, received vector, $r_m$, of the $m^{th}$ sampled sequence.

$$r_m = \sum_{i=1}^{K} r_m^{(k)} + n, m = 1 \ldots M \qquad \text{Equation 5}$$

For an M multiple of chip rate sampling, a single matrix expression is per Equation 6.

$$r' = A'd + n \qquad \text{Equation 6}$$

r' is the received signal vector and is defined as per Equation 7.

$$r' = \begin{bmatrix} r_1 \\ r_2 \\ \vdots \\ r_M \end{bmatrix} r_1 \qquad \text{Equation 7}$$

A' is defined as per Equation 8.

$$A' = \begin{bmatrix} A_1 \\ A_2 \\ \vdots \\ A_M \end{bmatrix} \qquad \text{Equation 8}$$

Equation 9 is Equation 6 rewritten as a summation form of K bursts.

$$r' = \sum_{k=1}^{K} A'^{(k)} \underline{d}^{(k)} + \underline{n} \qquad \text{Equation 9}$$

Equation 9 can be rewritten as Equation 10.

$$r' = \sum_{k=1}^{K} H'^{(k)} C^{(k)} \underline{d}^{(k)} + \underline{n} \qquad \text{Equation 10}$$

$C^{(k)}$ is code sequence of the $k^{th}$ burst. $H'^{(k)}$ is the channel response for the $k^{th}$ sequence, which is defined for M multiple chip rate sampling per Equation 11.

$$H'^{(k)} = \begin{bmatrix} H_1^{(k)} \\ H_2^{(k)} \\ \vdots \\ H_M^{(k)} \end{bmatrix} \qquad \text{Equation 11}$$

When all the signal bursts in a time slot arise from the same user in the uplink or go to the same user in the downlink, the bursts pass through the same propagation path and, accordingly, the same fading channel. As a result, $H'^{(k)}$ is the same for all bursts ($H'^{(k)} = H'^{(j)} = H'_c$, for all k and j) and is replaced in Equation 10 with $H'_c$ as per Equation 12.

$$\underline{r}' = H'_c \sum_{k=1}^{K} C^{(k)} \underline{d}^{(k)} + \underline{n} \qquad \text{Equation 12}$$

Equation 13 is Equation 12 rewritten as a single matrix expression.

$$r' = H'_c d + n \qquad \text{Equation 13}$$

C is the code matrix. For M chip rate sampling, $H'_c$ is per Equation 14.

$$H'_c = \begin{bmatrix} H_{c1} \\ H_{c2} \\ \vdots \\ H_{cM} \end{bmatrix} \qquad \text{Equation 14}$$

For an $m^{th}$ chip rate sample, $H_{cm}$ is the channel response for the $m^{th}$ sampled sequence. Each $H_{cm}$, m=1 ... M, is determined by the channel estimation device 44, 50. The matrix structure of each $H_{cm}$ is per Equation 15, 52.

$$H_{cm} = \begin{bmatrix} h_{m,0} & 0 & & & 0 \\ h_{m,1} & h_{m,0} & 0 & & \\ h_{m,2} & h_{m,1} & \ddots & & \\ \vdots & h_{m,2} & & \ddots & \\ \vdots & \vdots & & & \ddots \\ h_{m,W-3} & \vdots & & \ddots & 0 \\ h_{m,W-2} & h_{m,W-3} & & h_{m,0} & 0 \\ h_{m,W-1} & h_{m,W-2} & & h_{m,1} & h_{m,0} \\ 0 & h_{m,W-1} & & h_{m,2} & h_{m,1} \\ & 0 & \ddots & \vdots & h_{m,2} \\ & & 0 & \ddots & \vdots & \vdots \\ & & & \ddots & h_{m,W-3} & \vdots \\ & & & & h_{m,W-2} & h_{m,W-3} \\ & & & 0 & h_{m,W-1} & h_{m,W-2} \\ 0 & & & & 0 & h_{m,W-1} \end{bmatrix} \qquad \text{Equation 15}$$

The overall signal model of data detection is represented as per Equations 16 and 17.

$$r' = H'_c s + n \qquad \text{Equation 16}$$

$$s = Cd \qquad \text{Equation 17}$$

s is the spread data chip vector. C is the code vector. One approach to determine s is to use a zero forcing (ZF) solution of Equation 16 as per Equation 18.

$$s = (H'^H_c H'_c)^{-1} H'^H_c r \qquad \text{Equation 18}$$

$H'^H_c$ is the hermitian of $H'_c$. Another approach is to use a minimum mean square error (MMSE) solution as per Equation 19.

$$s = (H'^H_c H'_c + \sigma^2 I)^{-1} H'^H_c r \qquad \text{Equation 19}$$

$\sigma^2$ is the noise variance. I is the identity matrix. After solving either Equation 17 or 18 for s, the solution of Equation 15 is obtained by despreading, as represented by Equation 20, 56.

$$d = C^H s \qquad \text{Equation 20}$$

The following approaches to solve Equations 18 and 19 for s use a fast fourier transform (FFT) decomposition of either a circulant approximation of the channel correlation matrix, R, or the channel response matrix, $H'_c$, 54. Using either matrix requires an approximation; however, using the channel response matrix, $H'_c$, also requires truncation of the last W−1 rows of the matrix to make it square. Accordingly, to eliminate degradation due to truncation, the channel correlation matrix, R, is preferably used.

A FFT decomposition of the channel correlation matrix, R, is performed as follows. For a ZF approach, R is defined as per Equation 21.

$$R = H'^H_c H'_c = \sum_{m=1}^{M} H^H_{cm} H_{cm} \qquad \text{Equation 21}$$

For a MMSE approach, R is defined as per Equation 22.

$$R = H'^H_c H'_c + \sigma^2 I \qquad \text{Equation 22}$$

The structure of the channel correlation matrix, R, is represented as per Equation 23.

$$R = \begin{bmatrix} R_0 & R_1 & \cdots & R_{W-1} & 0 & 0 & \cdots & & & & & 0 \\ R_1^* & R_0 & \ddots & & R_{W-1} & 0 & \ddots & & & & & \\ & R_1^* & \ddots & R_1 & & R_{W-1} & \ddots & 0 & & & & \\ R_{W-1}^* & & \ddots & R_0 & R_1 & & \ddots & 0 & 0 & & & \\ 0 & R_{W-1}^* & & R_1^* & R_0 & \ddots & & R_{W-1} & 0 & & & \\ 0 & 0 & \ddots & & R_1^* & \ddots & \ddots & & R_{W-1} & \ddots & 0 & \vdots \\ \vdots & 0 & \ddots & R_{W-1}^* & & \ddots & \ddots & R_1 & & \ddots & 0 & 0 \\ & & \ddots & 0 & R_{W-1}^* & & \ddots & R_0 & R_1 & R_{W-1} & 0 \\ & & & 0 & 0 & R_{W-1}^* & & R_1^* & R_0 & \ddots & & R_{W-1} \\ & & & & 0 & 0 & \ddots & & R_1^* & \ddots & R_1 & \\ & & & & & 0 & \ddots & R_{W-1}^* & & \ddots & R_0 & R_1 \end{bmatrix}$$

Equation 23

Equations 18 and 19 are rewritten in terms of R as per Equations 24 and 25, respectively.

$$s = R^{-1} H_c'^H r \qquad \text{Equation 24}$$

$$Rs = H_c'^H r \qquad \text{Equation 25}$$

The matrix-vector multiplication Rs can be viewed as a linear combination of column vectors of the channel correlation matrix, R, weighted by the corresponding elements of data chip vector s, as per Equation 26.

$$Rs = s_1 g_1 + s_2 g_2 + \ldots + s_W g_W + s_{W+1} g_{W+1} + \ldots + s_{N-SF} g_{N-SF} \qquad \text{Equation 26}$$

$g_i$ is the $i^{th}$ column of the channel correlation matrix R. $s_i$ is the $i^{th}$ element of spread data chip vector s.

By modifying the structure of matrix R, an optimum circulant matrix approximation of channel correlation matrix, $R_{cir}$, can be determined using Equation 27.

$$R_{cir} = \begin{bmatrix} R_0 & R_1 & \cdots & R_{W-1} & 0 & 0 & \cdots & 0 & 0 & \ddots & \vdots & R_1^* \\ R_1^* & R_0 & \ddots & & R_{W-1} & 0 & \ddots & & & \ddots & R_{W-1}^* & \vdots \\ & R_1^* & \ddots & R_1 & & R_{W-1} & \ddots & 0 & & & 0 & R_{W-1}^* \\ R_{W-1}^* & & \ddots & R_0 & R_1 & & \ddots & 0 & 0 & & & 0 \\ 0 & R_{W-1}^* & & R_1^* & R_0 & \ddots & & R_{W-1} & 0 & & & \\ 0 & 0 & \ddots & & R_1^* & \ddots & \ddots & & R_{W-1} & \ddots & 0 & \vdots \\ \vdots & 0 & \ddots & R_{W-1}^* & & \ddots & \ddots & R_1 & & \ddots & 0 & 0 \\ & & \ddots & 0 & R_{W-1}^* & & \ddots & R_0 & R_1 & R_{W-1} & 0 \\ 0 & & & 0 & 0 & R_{W-1}^* & & R_1^* & R_0 & \ddots & \vdots & R_{W-1} \\ R_{W-1} & 0 & & & 0 & 0 & \ddots & & R_1^* & \ddots & R_1 & \vdots \\ \vdots & R_{W-1} & \ddots & & & 0 & \ddots & R_{W-1}^* & & \ddots & R_0 & R_1 \\ R_1 & \vdots & \ddots & 0 & 0 & \cdots & 0 & 0 & R_{W-1}^* & \cdots & R_1^* & R_0 \end{bmatrix}$$

Equation 27

The first column, q, has the full non-zero elements without any truncation. The circulant matrix, $R_{cir}$, is defined by its first column q. The first column q of circulant matrix $R_{cir}$, is obtained by permuting the $W^{th}$ column $g_W$ of the channel correlation matrix, R, using the permutation operator or index vector as defined by Equation 28.

$$p = [W:N \cdot Q, 1:W-1] \qquad \text{Equation 28}$$

Alternately, a circulant matrix is also defined by the $W^{th}$ column $g_W$ of channel correlation matrix, R. In general, any column greater than $W^{th}$ column may be used with a proper index vector (permutation vector).

This alternate approximate circulant channel correlation matrix, $R'_{cir}$, relates to $R_{cir}$ per Equation 29.

$$R'_{cir} = R_{cir}(:,p). \qquad \text{Equation 29}$$

The advantage with this approach is that $g_W$ is used directly without permutation. However, the solved spread data chip vector s is required to be inverse permuted by the index vector $\bar{p}$ as per Equation 30.

By permuting the first row in the previous approach, the need for inverse permuting s is eliminated.

$$\bar{p} = [N \cdot SF - W + 2 : N \cdot SF, 1 : N \cdot SF - W + 1] \qquad \text{Equation 30}$$

Equation 31 is the FFT decomposition of matrix $R_{cir}$.

$$R_{cir} = D_P^{-1} \Lambda_R D_P \qquad \text{Equation 31}$$

$D_P$ is the P-point FFT matrix and $\Lambda_R$ is diagonal matrix, whose diagonal is the FFT of the first column of matrix $R_{cir}$. $\Lambda_R$ is defined as $\Lambda_R = \text{diag}(D_P q)$ Using a FFT decomposition of the channel response matrix, $H'_c$, is performed as follows. Matched filtering, $H_c'^H r'$, is represented by Equation 32.

$$H_c'^H r' = \sum_{m=1}^{M} H_{cm}^H r_m \qquad \text{Equation 32}$$

The channel response matrix that corresponds to each sampled sequence, $H_{cm}$, m=1,2, ..., M, are circulant matrixes. Each matrix can be decomposed into three FFT matrix multiplication as per Equation 33.

$$H_{cm} = D_P^{-1} \Lambda_{H_{cm}} D_P, \quad m=1 \ldots M \quad \text{Equation 33}$$

As a result, the decomposition of the channel response matrix is per Equation 34.

$$H_c'^H \underline{r}' = D_P^{-1} \sum_{m=1}^{M} \Lambda_{H_{cm}}^* D_P \underline{r}_m \quad \text{Equation 34}$$

To recover the data chip vector s, Equation 35 is used.

$$\underline{s} = R_{cir}^{-1} H_c'^H \underline{r}' = D_P^{-1} \Lambda_R^{-1} \sum_{m=1}^{M} \Lambda_{H_{cm}}^* D_P \underline{r}_m \quad \text{Equation 35}$$

In the frequency domain, Equation 35 becomes Equation 36.

$$F(\underline{s}) = \frac{\sum_{m=1}^{M} F(\underline{h}_m)^* \otimes F(\underline{r}_m)}{F(\underline{q})} \quad \text{Equation 36}$$

⊗ represents the operation of element by element multiplication. Using Equation 36, F(s) is determined. By taking the inverse transform of F(s), the spread data vector, s, is determined. If used for multi-user detection in the downlink or a single user solely uses one time slot in the uplink, s is despread by using all of the codes to recover the transmitted data d as soft symbols. If used for single user detection in the downlink, s is despread using that user's codes to recover that user's data as soft symbols. Hard decisions are made to convert the soft symbols to hard symbols.

Two approaches to implement the FFT composition are a prime factor algorithm (PFA) and a radix-2 algorithm. Although a PFA is considered more efficient than a radix-2 algorithm when a non-power-of-two number of FFT points is used, the following complexity analysis is based on a radix-2 FFT implementation for simplicity. The complexity based on radix-2 algorithm can be considered as the worst case. Additional improvement in complexity is obtainable when PFA is used. Zero-padding radix-2 FFT implementation entails the zero-padding the first column of $H_{cm}$, m=1 ... M, the vectors $r_m$, m=1 ... M and q. The zero-padding makes their length equal to the nearest radix-2 integer that is greater than or equal to the length of a data field. For example, the length of a data field is 976 chips for burst type 1 in a TDD burst specified by 3GPP W-CDMA standard. The nearest radix-2 integer of 976 is 1024 (P=1024). P is the radix-2 integer.

Four types of radix-2 FFT computations are required:

$$D_P \underline{r}_m, \quad D_P \underline{h}_m, \quad D_P \underline{g}_1$$
$$P$$

and $D_P(.)/p$. Two of the computations are computed M times for all sampled sequences: $D_P \underline{r}_m$, m=1 ... M and $D_P \underline{h}_m$, m= 1 ... M. The other two are performed only once for the sampled sequences. $D_P \underline{h}_m$, m=1 ... M and $D_P \underline{g}_1$ are computed once per time slot.

$$D_P \underline{r}_m, \quad m=1 \ldots M, \quad \frac{D_P(\cdot)}{P}$$

are computed twice per time slot. As a result, a total of 3(M+1) radix-2 FFT computations are required. Each needs $P \log_2 P$ complex operations. By assuming each complex operation requires four real operations, the complexity for radix-2 FFT computations in terms of million real operations per second (MROPS) is per Equation 37.

$$C_1 = 3(M+1) P \log_2 P \cdot 4 \cdot 100 \cdot 10^{-6} \text{ MROPS} \quad \text{Equation 37}$$

For the complexity of the vector multiplications, there are M element-to-element vector multiplications and one element-to-element vector division, which are performed twice per time slot. As a result, the complexity for the vector operations in terms of MROPS is per Equation 38.

$$C_2 = 2(M+1) P \cdot 4 \cdot 100 \cdot 10^{-6} \text{MROPS} \quad \text{Equation 38}$$

For the complexity of calculating the vector q it requires $MW^2$ complex operations, which are performed once per time slot. The complexity in terms of MROPS is per Equation 39.

$$C_3 = MW^2 \cdot 4 \cdot 100 \cdot 10^{-6} \text{ MROPS} \quad \text{Equation 39}$$

The total complexity except for the despreading in MROPS is per Equation 40.

$$C_{fft} = C_1 + C_2 + C_3 \text{ MROPS} \quad \text{Equation 40}$$

Despreading is performed twice per time slot. The complexity of despreading in terms of MROPS is per Equation 41.

$$C_{desp} = 2 \cdot K \cdot N \cdot Q \cdot 4 \cdot 100 \cdot 10^{-6} \text{MROPS} \quad \text{Equation 41}$$

As a result, the total complexity of the data detection including despreading is per Equations 42 or 43.

$$C_{Total} = C_{fft} + C_{desp} \text{ MROPS} \quad \text{Equation 42}$$

$$C_{Total} = [3(M+1) P \log_2 P + 2(M+1) P + MW^2 + 2KNQ] \cdot 4 \cdot 100 \cdot 10^{-6} \text{MROPS} \quad \text{equation 43}$$

The following tables show the complexity in MROPS for a 1024-point radix-2 (P=1024) computation. Complexity is shown in Tables 1 at the chip rate and at Table 2 at twice the chip rate sampling. A complexity comparison is made in MROPS between BLE-JD using approximate Cholesky decomposition and low complexity data detection, as shown in Tables 3 and 4. Table 5 is a complexity comparison showing the complexity of low complexity data detection as a percentage of the complexity of BLE-JD using approximate Cholesky decomposition. As shown, low complexity data detection has a much lower complexity than approximate Cholesky based BLE-JD. Depending on the number of bursts transmitted and spreading factors, for most cases, low complexity data detection is 25% at the chip rate, and 30% at twice the chip rate, of the complexity of approximate Cholesky based BLE-JD.

TABLE 1

MROPS of a full-burst using low complexity data detection for burst type 1 at chip rate sampling.

| | Funcs Executed once per burst | | Funcs executed twice per half-burst | | | |
|---|---|---|---|---|---|---|
| # of bursts, K | Construct $q$ | Compute $D_P \underline{h}_m$ $m = 1 \ldots M$ Via Radix-2 FFT | Compute $D_P \underline{g}_1$ Via Radix-2 FFT | Compute $D_P \underline{r}_m$ $M = 1 \ldots M$ Via Radix-2 FFT | Compute $\frac{D_P(\cdot)}{P}$ Via Radix-2 FFT | Despread $C^{(k)H}\underline{s}$ | Total |
| 1 | 1.3 | 4.1 | 4.1 | 8.2 | 8.2 | 0.78 | 26.7 |
| 8 | 1.3 | 4.1 | 4.1 | 8.2 | 8.2 | 6.25 | 32.2 |
| 12 | 1.3 | 4.1 | 4.1 | 8.2 | 8.2 | 9.4 | 35.3 |
| 13 | 1.3 | 4.1 | 4.1 | 8.2 | 8.2 | 10.1 | 36 |
| 14 | 1.3 | 4.1 | 4.1 | 8.2 | 8.2 | 10.9 | 36.8 |
| 16 | 1.3 | 4.1 | 4.1 | 8.2 | 8.2 | 12.5 | 38.4 |

TABLE 2

MROPS of a full-burst using low complexity data detection for burst type 1 and twice chip rate sampling.

| | Funcs Executed once per burst | | Funcs executed twice per half-burst | | | |
|---|---|---|---|---|---|---|
| # of bursts, K | Construct $q$ | Compute $D_P \underline{h}_m$ $m = 1 \ldots M$ Via Radix-2 FFT | Compute $D_P \underline{g}_1$ Via Radix-2 FFT | Compute $D_P \underline{r}_m$ $M = 1 \ldots M$ Via Radix-2 FFT | Compute $\frac{D_P(\cdot)}{P}$ Via Radix-2 FFT | Despread $C^{(k)H}\underline{s}$ | Total |
| 1 | 2.6 | 8.2 | 8.2 | 16.4 | 16.4 | 0.78 | 52.6 |
| 8 | 2.6 | 8.2 | 8.2 | 16.4 | 16.4 | 6.25 | 58.1 |
| 12 | 2.6 | 8.2 | 8.2 | 16.4 | 16.4 | 9.4 | 61.2 |
| 13 | 2.6 | 8.2 | 8.2 | 16.4 | 16.4 | 10.1 | 61.9 |
| 14 | 2.6 | 8.2 | 8.2 | 16.4 | 16.4 | 10.9 | 62.7 |
| 16 | 2.6 | 8.2 | 8.2 | 16.4 | 16.4 | 12.5 | 64.3 |

TABLE 3

Comparison in MROPS between BLE-JD (approximate Cholesky decomposition) and low complexity data detection at chip rate sampling.

| Spreading Factor, Q | # of bursts, K | Proposed algorithm | BLE-JD |
|---|---|---|---|
| 1 | 1 | 26.7 | 318.2 |
| 16 | 8 | 32.2 | 81.1 |
| | 12 | 35.3 | 174.6 |
| | 13 | 36 | 205.5 |
| | 14 | 36.8 | 239.4 |
| | 16 | 38.4 | 318.2 |

TABLE 4

Comparison in MROPS between BLE-JD (approximate Cholesky decomposition) and low complexity data detection at twice the chip rate sampling.

| Spreading Factor, Q | # of bursts, K | Proposed algorithm | BLE-JD |
|---|---|---|---|
| 1 | 1 | 52.6 | 427.6 |
| 16 | 8 | 58.1 | 124.8 |
| | 12 | 61.2 | 248.3 |
| | 13 | 61.9 | 287.7 |
| | 14 | 62.7 | 330.4 |
| | 16 | 64.3 | 427.6 |

TABLE 5

Complexity of FFT of the channel correlation matrix as a percentage of the complexity of approximate Cholesky based BLE-JD. Approximate Cholesky based BLE-JD is set at 100% complexity.

| Spreading Factor, Q | # of bursts, K | Chip rate sampling | Twice the chip rate sampling |
|---|---|---|---|
| 1 | 1 | 8% | 12% |
| 16 | 8 | 39% | 47% |
| | 12 | 20% | 25% |
| | 13 | 18% | 22% |
| | 14 | 15% | 19% |
| | 16 | 12% | 15% |

FIGS. 5-15 are graphs of the performance of low complexity data detection. Two high date rate services are simulated. One is single-code transmission with SF=1 and the other is multi-code transmission with twelve codes and spreading factor 16 for each. Low complexity data detection is tested under various delay spread types including 3GPP working group four (WG4) defined delay spread channel cases 1, 2 and 3. The simulations are set for both chip rate and twice the chip rate sampling. The length of delay spread is assumed W=57. Zero timing error is assumed through the whole simulations. The channel impulse response is assumed to be exactly known. In general, the bit error rate (BER) performance of the multi-code case is better than its corresponding single-code counterpart in the simulation. For the particular example used in the simulation, single-code transmission uses 16 resource units per time slot while the multi-code transmission uses only 12 resource units in each time slot. Using only 12 codes produces less interference and therefore better BER. As compared with BLE-JD, only little or limited performance degradation are observed for proposed algorithm based on FFT decomposition of the channel correlation matrix (FFT-R) in both single-code and multi-code cases. In single-code case, the FFT-R based approach is identical to the block linear equalization structure. The proposed FFT-R based approach and the approach based on FFT of the channel response matrix (FFT-H) are identical to each other at the chip rate sampling.

The performance of low complexity data detection using FFT-R and FFT-H is compared to an ideal single user bond, a worst case matched filtering, BLE-JD and single user detection with BLE using an approximate Cholesky decomposition. For the working points of interest, the BER range was typically between 1% and 10%. Only a little or limited signal to noise ratio (SNR) performance degradations are observed for low complexity data detection as compared with BLE-JD, and significant SNR performance enhancement over matched filtering (MF). Low complexity data detection also performs well in an additive white gaussian noise (AWGN) channel environment. FIGS. 5-15 show that low complexity data detection offers very comparable performance in BER or SNR at much lower complexity and power consumption as compared to BLE-JD using approximate Cholesky decomposition.

What is claimed is:

1. A method for use in wireless communication, the method comprising:
   receiving a plurality of data signals as a received vector;
   estimating a channel response of the received vector;
   constructing a channel response matrix representing a channel of the received vector based on the estimated channel response;
   constructing a channel correlation matrix based at least in part on a product of the channel response matrix and a complex conjugate of the channel response matrix;
   determining a spread data vector using a fast Fourier transform (FFT) decomposition of a circulant approximation of the channel correlation matrix and the received vector; and
   despreading the spread data vector to recover data from the received vector.

2. The method of claim 1, further comprising:
   sampling the received vector at a chip rate of the received vector for use in the estimating a channel response and the determining a spread data vector.

3. The method of claim 1, further comprising:
   sampling the received vector at a multiple of a chip rate of the received vector for use in the estimating a channel response and the determining a spread data vector.

4. The method of claim 3 wherein the multiple of the chip rate is twice the chip rate.

5. A receiver comprising:
   an input configured to receive a plurality of data signals as a received vector;
   a channel estimator configured to estimate a channel response of the received vector; and
   a data detector configured to:
     construct a channel response matrix representing a channel of the received vector based on the estimated channel response;
     construct a channel correlation matrix based at least in part on a product of the channel response matrix and a complex conjugate of the channel response matrix;
     determine a spread data vector using a fast Fourier transform (FFT) decomposition of a circulant approximation of the channel correlation matrix and the received vector; and
     despread the spread data vector to recover data from the received vector.

6. The receiver of claim 5, further comprising:
   a sampling device configured to sample the received vector at a multiple of a chip rate of the received vector, and to provide the samples to the channel estimator and the data detector.

7. The receiver of claim 6 wherein the sampling device is configured to sample the received vector at twice the chip rate.

8. The receiver of claim 5, further comprising:
   a sampling device configured to sample the received vector at a chip rate of the received vector, and to provide the samples to the channel estimator and the data detector.

9. A user equipment (UE) comprising the receiver of claim 5.

10. A base station comprising the receiver of claim 5.

11. A user equipment (UE) comprising the receiver of claim 6.

12. A base station comprising the receiver of claim 6.

13. A user equipment (UE) comprising the receiver of claim 7.

14. A base station comprising the receiver of claim 7.

15. A user equipment (UE) comprising the receiver of claim 8.

16. A base station comprising the receiver of claim 8.

* * * * *